US006408132B1

(12) United States Patent
Ishikawa

(10) Patent No.: US 6,408,132 B1
(45) Date of Patent: Jun. 18, 2002

(54) PHOTO-STICKER VENDING MACHINE

(75) Inventor: Junya Ishikawa, Gifu (JP)

(73) Assignee: Ohiragiken Industry Co., Ltd., Gifu (JP)

( * ) Notice: Subject to any disclaimer, the term of this patent is extended or adjusted under 35 U.S.C. 154(b) by 0 days.

(21) Appl. No.: 09/456,678

(22) Filed: Dec. 8, 1999

(30) Foreign Application Priority Data

Dec. 24, 1998 (JP) .......................................... 10-366394

(51) Int. Cl.[7] ........................ G03B 15/00; G03B 19/00; G03B 29/00

(52) U.S. Cl. ........................................... 396/2; 396/429

(58) Field of Search ................................ 396/2, 30, 31, 396/310, 429; D20/2; 455/90

(56) References Cited

U.S. PATENT DOCUMENTS

| | | | | |
|---|---|---|---|---|
| 5,897,220 A | * | 4/1999 | Huang et al. | 396/2 |
| 6,085,195 A | * | 7/2000 | Hoyt et al. | 707/10 |
| 6,120,379 A | * | 9/2000 | Tanaka et al. | 463/44 |
| 6,168,325 B1 | * | 1/2001 | Nagata | 400/120.01 |

FOREIGN PATENT DOCUMENTS

| | | |
|---|---|---|
| JP | 02196278 A | 8/1990 |
| JP | 3046096 | 11/1997 |
| JP | 10055489 A | 2/1998 |
| JP | 10-115866 | 5/1998 |

* cited by examiner

*Primary Examiner*—Christopher Mahoney
(74) *Attorney, Agent, or Firm*—Beyer Weaver & Thomas LLP

(57) ABSTRACT

A photo-sticker vending machine is described that allows a user to purchase a photo-sticker by inserting money into and operating the photo-sticker vending machine. The photo-sticker vending machine includes a printing image data memory for storing image data, a printer for printing image data on a photo-sticker sheet, a first controller for controlling the printer, a cutting data memory for storing cutting data, a cutting device for cutting the photo-sticker sheet to a predetermined shape, and a second controller for controlling the cutting device. The first controller commands the printer to print on the photo-sticker sheet based on the printing image data stored in the printing image data memory. The second controller commands the cutting device to cut the printed photo-sticker sheet based on the cutting data stored in the cutting data memory.

2 Claims, 12 Drawing Sheets

FIG. 4 IMAGE DATA OF PORTABLE TELEPHONE MODELS

PRINTING IMAGE DATA

CUTTING DATA

FIG.11
(a)
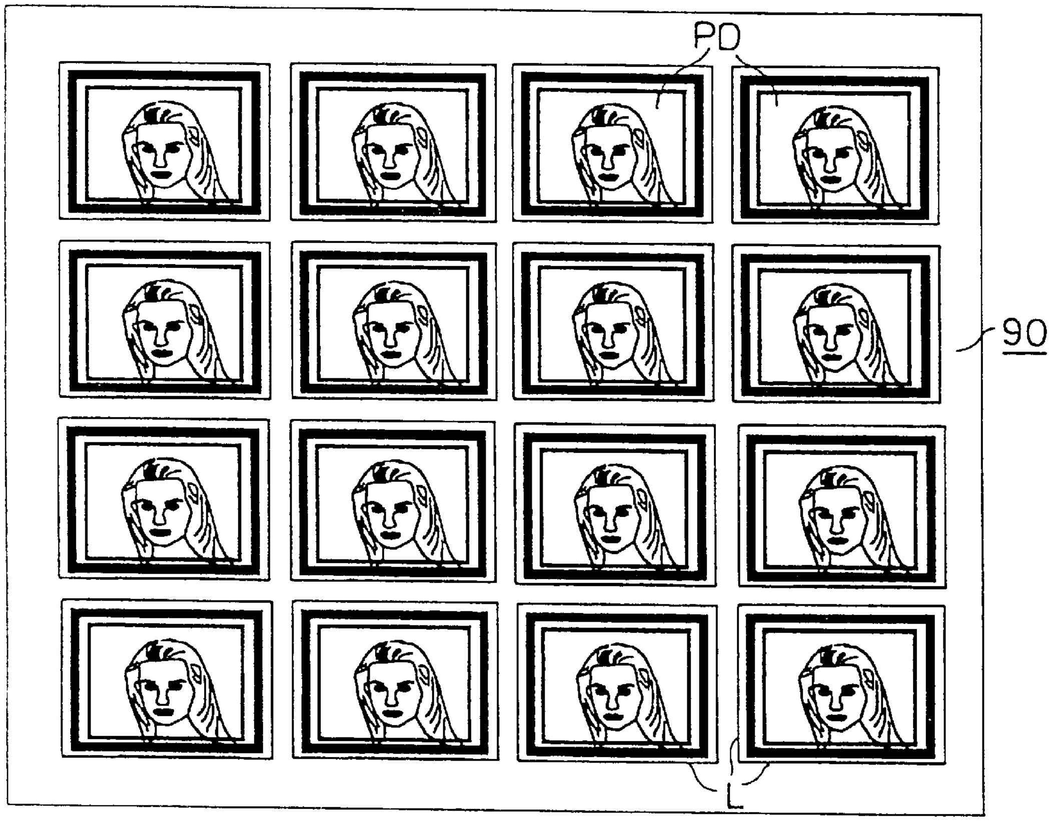
(b)
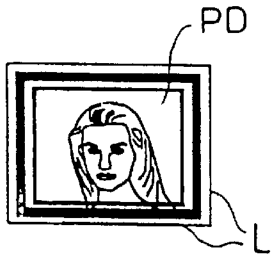

FIG. 12
(a)
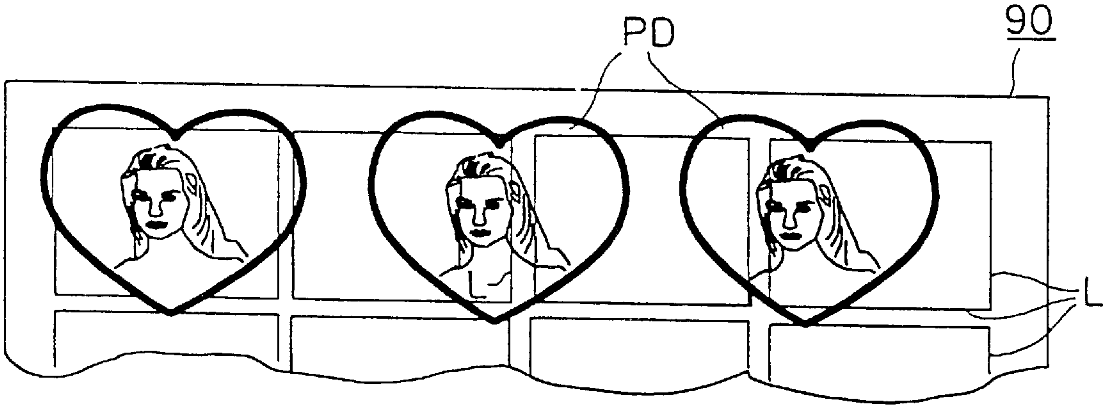
(b)
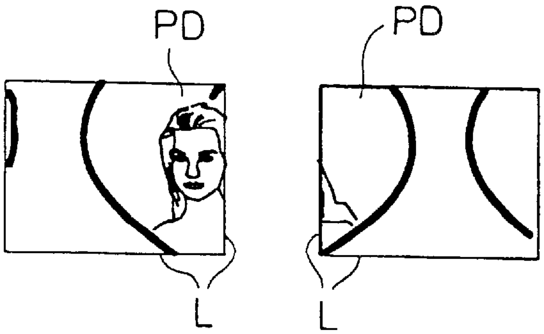

PHOTO-STICKER VENDING MACHINE

BACKGROUND OF THE INVENTION

1. Field of the Invention

The present invention relates to photo-sticker vending machines placed at video game arcades, department stores or the like.

2. Description of the Prior Art

Recently, various photo-sticker vending machines (often called as Print Club or "Pri-Kura") are marketed. In general, a photo-sticker vending machine captures an image of a player, for example, by a charge coupled device (CCD) camera, combines the player's image with a prepared frame image, i.e., the image arranged forward of the player's image (a combined composite image of the player's image and the frame image is hereinafter called a printing image in this prior art section), prints the printing image onto a photo-sticker sheet and finally dispenses the printed photo-sticker sheet.

With reference to FIG. 11(*a*), in most cases, a photo-sticker sheet 90, which is used in various prior art photo-sticker vending machines, has a preformed cutting lines L. During a printing process, a controller controls and commands a printer to print a printing image PD within a printing frame (a rectangular frame in FIG. 11(*a*)) that is surrounded by the cutting lines L. Therefore, each piece of printed sticker can be easily peeled off from a backing sheet along the cutting lines L, as shown in FIG. 11(*b*).

However, the prior art photo-sticker vending machines have following disadvantages.

Since the cutting lines L are preformed on the photo-sticker sheet 90, shape and size of each printing image PD must fit within the corresponding printing frame surrounded by the cutting lines L. That is , as shown in FIG. 12(*a*), if the printing image PD is sized and shaped to extend out of the corresponding printing frame, the printing image PD is printed across the cutting lines L on a plurality of photo-stickers. Therefore, the printing image PD is disadvantageously divided among these printed photo-stickers when the printed photo-stickers are peeled off, as shown in FIG. 12(*b*). As a result, shape and size of each printing image PD are determined by positions of the corresponding cutting lines L that are preformed on the photo-sticker sheet 90. That is, shape and size patterns of the printing image PD are limited due to the cutting lines L, so that the printed photo-sticker is not unique and is not interesting.

Furthermore, in a case of photo-sticker sheets 90 with preformed cutting lines L, a step of forming the cutting lines L on the photo-sticker sheets 90 and a dedicated cutting die for forming the cutting lines L are required in manufacturing of the photo-stickers 90. Therefore, there is another disadvantage of increasing a manufacturing cost of the photo-sticker sheets 90.

Alternatively, in a case of photo-sticker sheets 90 without preformed cutting lines L, various size and image variations of the printing image D can be achieved. However, a tedious cutting work of the printed photo-sticker along an outer peripheral line of corresponding printing image PD with, for example, some scissors is required before the printed photo-sticker is stuck on a desired object.

The present invention addresses the above disadvantages. A first objective of the present invention is to provide a photo-sticker vending machine that allows a printed portion of a photo-sticker sheet to be easily peeled off with a predetermined shape without requiring any preformed cutting lines on the photo-sticker sheet.

A second objective of the present invention is to provide a photo-sticker vending machine that can offer various printing image patterns.

SUMMARY OF THE INVENTION

For achieving the objectives of the present invention, a photo-sticker vending machine that allows a user to purchase a photo-sticker by inserting money into and operating the photo-sticker vending machine is provided in the present invention. The photo-sticker vending machine comprises a printing image data memory for storing prepared printing image data, a printer for printing the printing image data on a predetermined photo-sticker sheet, a first controller for controlling the printer, wherein the first controller commands the printer to print on the photo-sticker sheet based on the printing image data stored in the printing image data memory, a cutting data memory for storing cutting data, a cutting device for cutting the photo-sticker sheet to a predetermined shape, and a second controller for controlling the cutting device, wherein the second controller commands the cutting device to cut the photo-sticker sheet based on the cutting data stored in the cutting data memory.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objectives and advantages thereof, may best be understood by reference to the following description of the present preferred embodiments together with the accompanying drawings in which:

FIG. 8(*b*) is a front view-of the dispensed photo-sticker sheet;

FIG. 8(*c*) is a cross-sectional view taken along line X—X in FIG. 8(*b*);

FIG. 8(*d*) is a front view of the portable telephone of FIG. 8(*a*) after a photo-sticker peeled off from the photo-sticker sheet of FIG. 8(*b*) is stuck on its front surface;

FIG. 11(*a*) is a front view of a prior art photo-sticker sheet with preformed cutting lines;

FIG. 11(*b*) is a front view of a piece of photo-sticker that is peeled off along cutting lines;

FIG. 12(*a*) is a front view of the prior art photo-sticker sheet that has another printed image pattern, which is different from that of FIG. 11; and FIG. 12(*b*) is a front view of two adjacent photo-stickers that are peeled off along the cutting lines.

DETAILED DESCRIPTION OF THE PREFERRED EMBODIMENTS

One embodiment of the present invention will now be described with reference to accompanying drawings.

Figure 1:
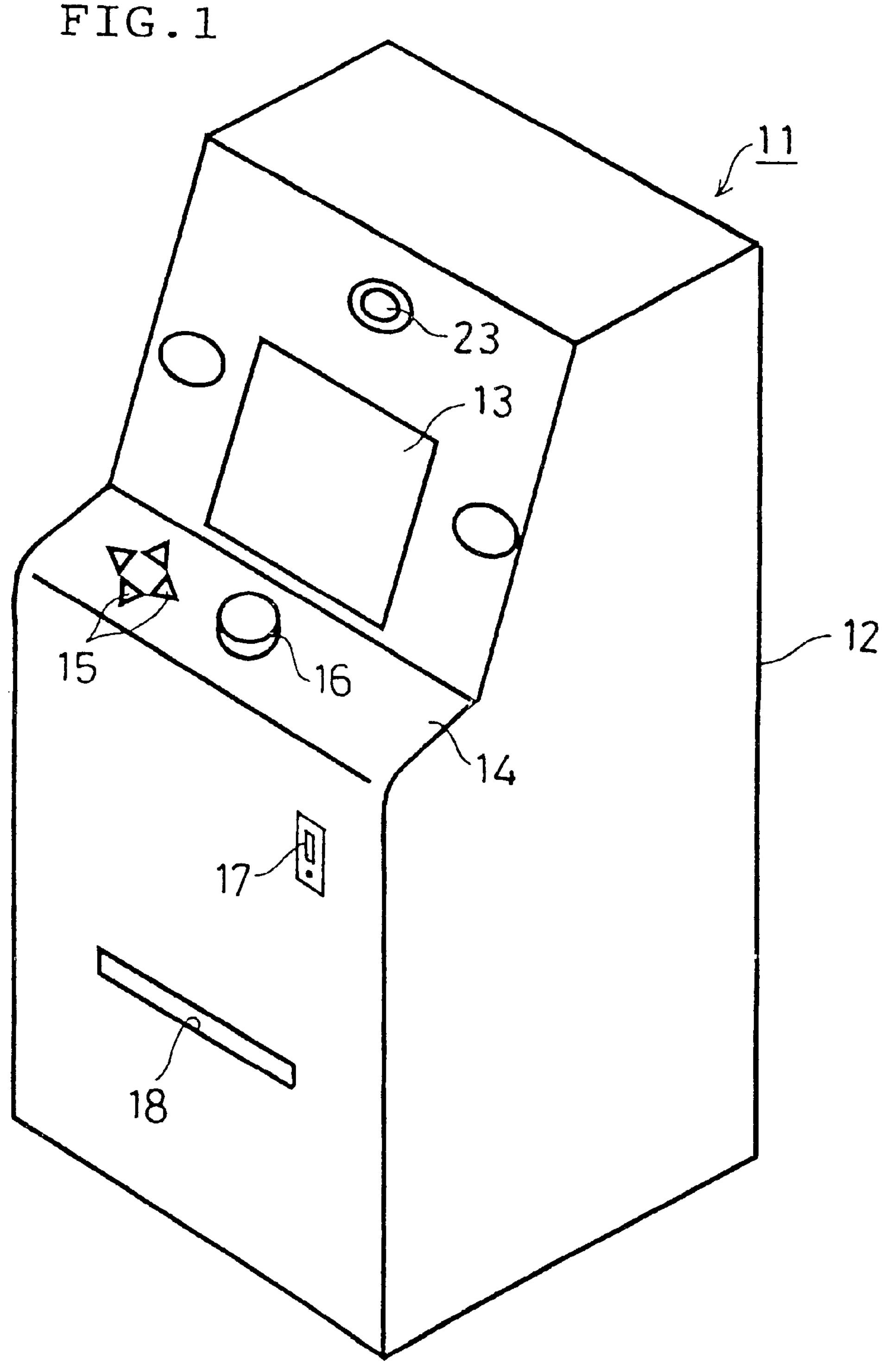
FIG. 1 is a perspective view of a photo-sticker vending machine according to one embodiment of the present invention.

As shown in FIG. 1, a display monitor 13 is arranged at an upper front wall of a machine body 12 that constitutes part of a photo-sticker dispensing machine 11. A control panel 14 is arranged below the display monitor 13 in the machine body 12. Cursor keys 15 and an enter button 16 are provided on the control panel 14. A coin selector 17 and an outlet opening 18 are provided at a lower front wall of the machine body 12. Furthermore, a CCD camera 23 acting as an external input means is provided above the display monitor 13.

Figure 3:
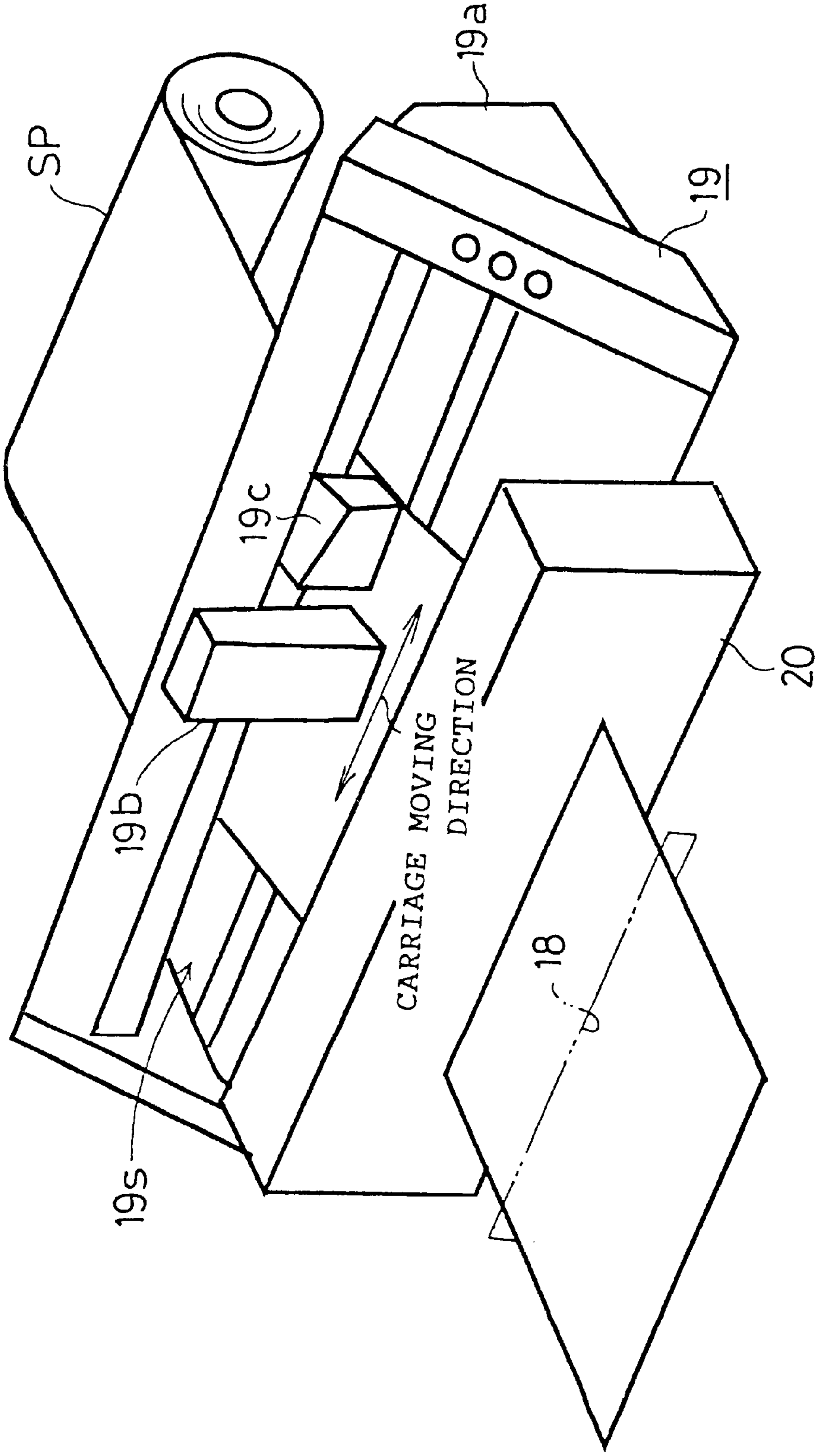
FIG. 3 is a perspective view of a printing/cutting device, a rolled photo-sticker sheet and a guillotine.

As shown in FIG. 3, a printing/cutting device 19 is accommodated within the machine body 12. In this embodiment, a rolled photo-sticker sheet is used as the photo-sticker sheet SP. The photo-sticker sheet SP is arranged behind of the printing/cutting device 19. The printing/cutting device 19 of the present embodiment has both printing and cutting capabilities in a single unit. In this embodiment, a model number PC-60 (product name: Color CAMM PRO) of Roland DG Corporation is used as the printing/cutting device 19. A guillotine 20 is arranged in front of the printing/cutting device 19. The guillotine 20 is provided for cutting the photo-sticker sheet SP to a predetermined length after it is processed by the printing/cutting device 19. The photo-sticker sheet SP, which is cut to a predetermined length by the guillotine 20, is then dispensed from the machine body 12 through the outlet opening 18.

Construction of the printing/cutting device 19 of the present embodiment will now be described briefly.

As shown in FIG. 3, a transit area 19*s*, through which the photo-sticker sheet SP is passed, is provided in a main body 19*a* of the printing/cutting device 19. A printing carriage 19*b*, which accommodates an ink ribbon and a printing head (both not shown) for printing on the photo-sticker sheet SP, is positioned at the front side (i.e., the side adjacent to the guillotine 20) in the transit area 19*s*. The printing carriage 19*b* is arranged to move in a left-right direction (i.e., the direction indicated with a double headed arrow) along a guide (not shown) of the main body 19*a*. A cutting carriage 19*c* is positioned adjacent to the printing carriage 19*b* at the front side in the transit area 19*s*. The cutting carriage 19*c* has a needle-like cutter (not shown) for cutting the photo-sticker sheet SP. Like the printing carriage 19*b*, the cutting carriage 19*c* is arranged to move in the left-right direction along a guide (not shown) of the main body 19*a*. Both the printing carriage 19*b* and the cutting carriage 19*c* are driven by a driving mechanism (not shown) to move automatically in the left-right direction. A feed roller (not shown) is provided at the bottom of the transit area 19*s* to feed the photo-sticker sheet SP in a forward-backward direction.

The printing and cutting operations of the printing/cutting device 19 will now be described briefly. Firstly, the printing carriage 19*b* and the feed roller are driven to print on the photo-sticker sheet SP. In the printing operation, the printing carriage 19*b* is moved in the left-right direction, and the photo-sticker sheet SP is fed forward. After the printing operation is completed, the cutting carriage 19*c* is moved in the left-right direction, and the photo-sticker sheet SP is moved in the forward-backward direction. That is, in the cutting operation, a cutting line, such as a diagonal line, a circular line or any other geometrical line, is formed on the photo-sticker sheet SP by moving the cutting carriage 19*c* in the left-right direction and also moving the photo-sticker sheet SP in the forward-backward direction.

Figure 2:
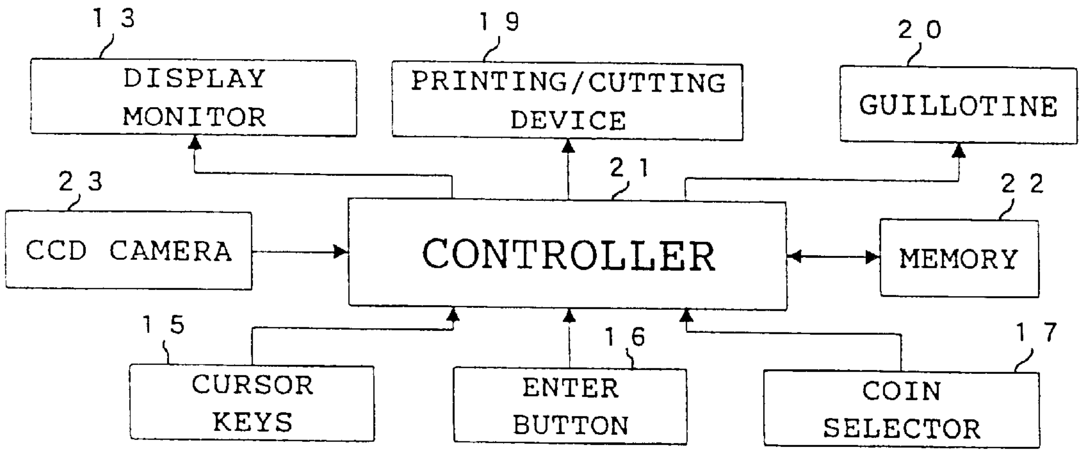
FIG. 2 is a block diagram showing electrical construction.

With reference to a block diagram of FIG. 2, electrical construction of the photo-sticker vending machine 11 will now be described. A controller 21, which acts as first and second controllers that constitute a selecting means for selecting printing image data and a selecting means for selecting cutting data respectively, is electrically connected with a memory 22. The memory 22 constitutes a memory for storing the printing image data and also a memory for storing the cutting data. Furthermore, the controller 21 is electrically connected with the cursor keys 15 and the enter button 16, which are operated by a player or user. Moreover, the controller 21 is electrically connected with the coin selector 17 for detecting insertion of a coin, the display monitor 13 for displaying images, the printing/cutting device 19, the guillotine 20 and the CCD camera 23 for capturing an image of the player.

Figure 4:
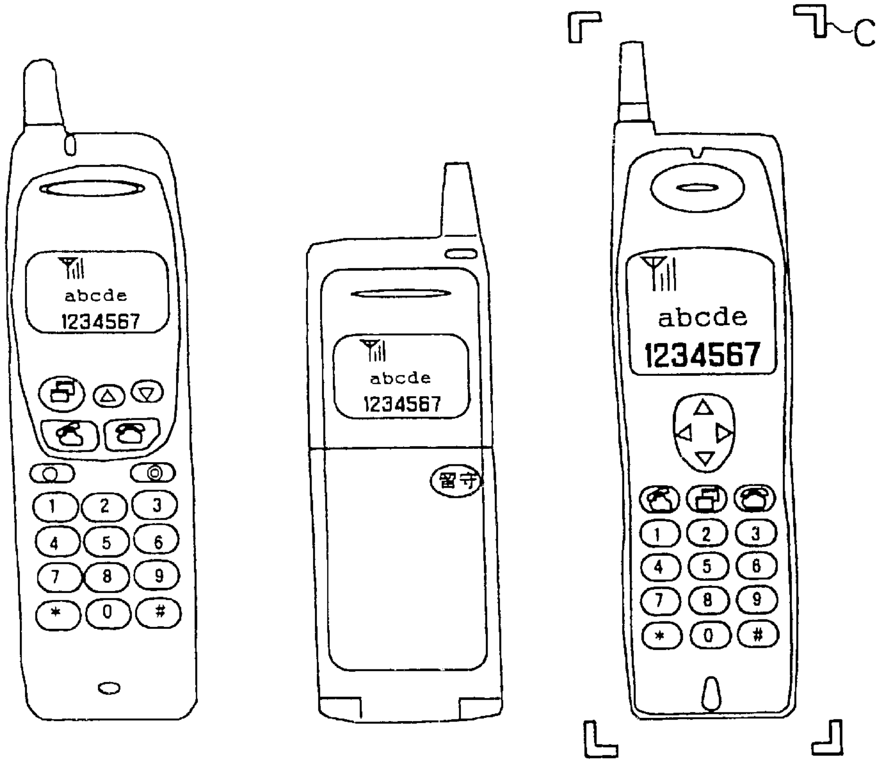
FIG. 4 is a diagram showing image data of portable telephone models stored in a memory.
Figure 5:
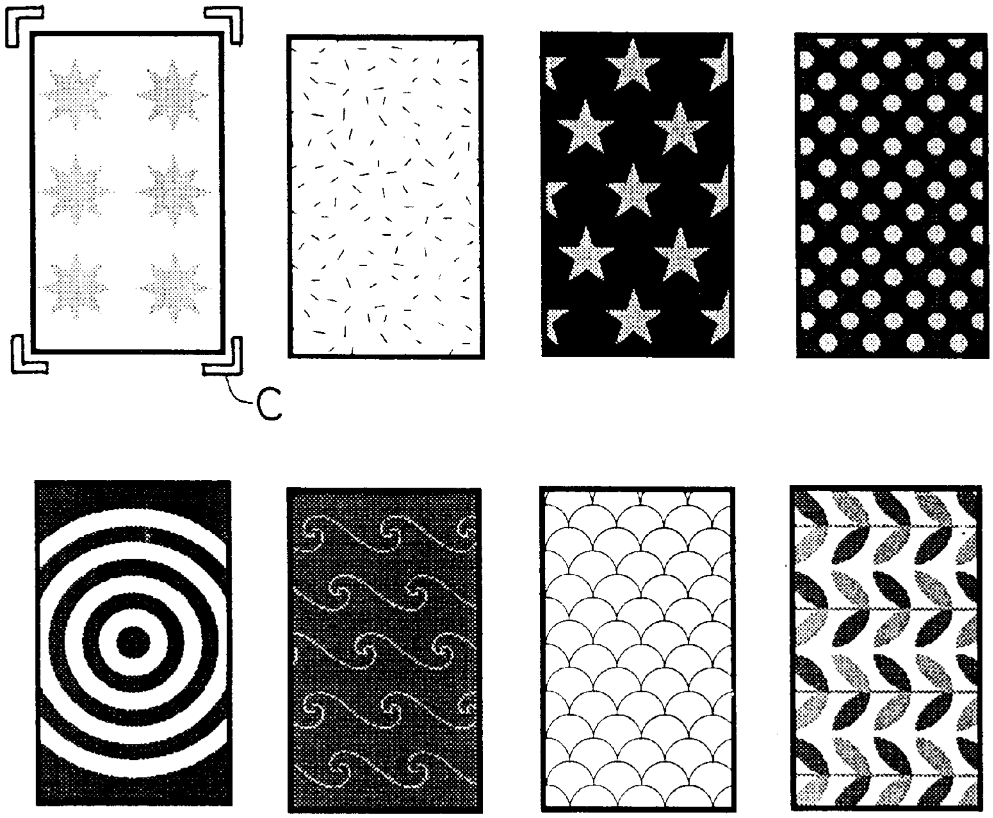
FIG. 5 is a diagram showing printing image data stored in the memory.

The memory 22 stores various image data of portable telephone models, such as those shown in FIG. 4. Furthermore, the memory 22 stores various printing image data of image patterns, such as those shown in FIG. 5. The controller 21 retrieves one printing image data among various printing image data stored in the memory 22 and then commands the printing/cutting device 19 to print on the photo-sticker sheet SP by operating the printing carriage 19*b* and the feed roller of the printing/cutting device 19 based on the retrieved printing image data. The memory 22 further stores various cutting data, such as those shown in FIG. 6. The controller 21 retrieves one cutting data among various cutting data stored in the memory 22 and then commands the printing/cutting device 19 to cut the photo-sticker sheet SP by operating the cutting carriage 19*c* and the feed roller of the printing/cutting device 19 based on the retrieved cutting data.

Figure 7:
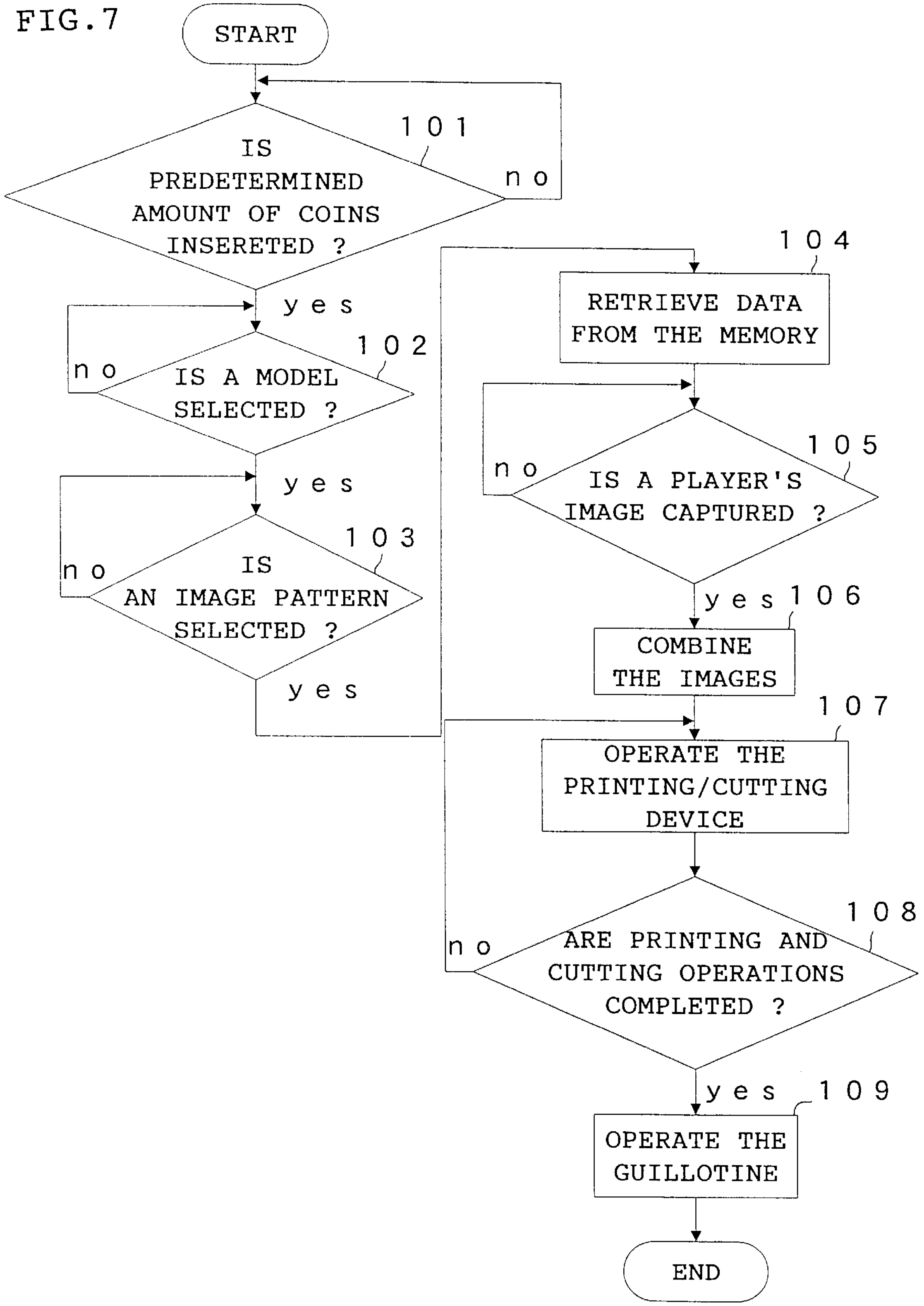
FIG. 7 is a process flow diagram showing control operation of a controller.

The operation of the controller 21 will now be described with reference to a process flow diagram of FIG. 7.

The process begins at step 101 in which the controller 21 determines whether a predetermined amount of coins is inserted into the coin selector 17 based on an output signal from the coin selector 17. When it is determined in step 101 that a predetermined amount of coins is inserted in the coin selector 17, then process flow moves to the next step 102 in which the controller 21 displays a model-selecting screen (see FIG. 4) on the display monitor 13 and waits for the player to choose his/her portable telephone model from various displayed portable telephone models. The player manipulates the cursor keys 15 to move a cursor C onto a displayed image of the same portable telephone model that he/she uses. Once the player moved the cursor C onto the displayed image of the same portable telephone model that he/she uses, the player presses the enter button 16. When the enter button 16 is pressed in step 102, the controller 21 determines that the portable telephone model is selected by the player, and then moves to step 103.

In step 103, the controller 21 displays an image pattern selecting screen (see FIG. 5) for selecting a desired image pattern from various image patterns on the display monitor 13 and waits for the player to choose a desired image pattern from various displayed image patterns. When the image pattern selecting screen is displayed, the player manipulates the cursor keys 15 and moves the cursor C onto a desired image pattern. After the cursor C is moved onto a desired image pattern, the player presses the enter button 16. When the enter button 16 is pressed in step 103, the controller 21 determines that the image pattern is selected and moves to following step 104. In step 104, a cutting data corresponding to the portable telephone model, which is selected in step 102, is retrieved from the memory 22, and a printing image data corresponding to the image pattern, which is selected in step 103, is also retrieved from the memory 22.

In the next step 105, an image of the player is captured by the CCD camera 23. In step 106, the printing image data retrieved from the memory 22 and the player's image captured by the CCD camera 23 are combined together to form a composite printing image. In steps 107 and 108, the printing/cutting device 19 is operated, and the composite printing image, which is produced in step 106, is printed on the photo-sticker sheet SP, and then the printed photo-sticker sheet SP is cut based on the cutting data. Before the printing operation of the composite printing image in step 108, the controller 21 places the player's image captured in step 105 at a predetermined position relative to the image pattern to form the composite printing image and then proceeds the printing operation. The position of the player's image captured by the CCD camera 23 is predetermined for respective portable telephone model stored in the memory 22. Once the printing and cutting operations are completed, process flow moves to step 109 in which the controller 21 commands the guillotine 20 to cut the photo-sticker sheet SP at a predetermined appropriate length (i.e., a length that is long enough to cover entire length of the printed image) and then terminates the entire operatiopn.

Practical operation of the photo-sticker vending machine 11 by the player will now be sequentially described.

Firstly, the player inserts a predetermined amount of coins into the coin selector 17. Then, the display monitor 13 displays the model-selecting screen of FIG. 4. The player controls the cursor keys 15 to move the cursor C onto the displayed image of the same portable telephone model that he/she uses, and then presses the enter button 16. In this embodiment, by way of example, it is assumed that the portable telephone model of FIG. 8(*a*) is the same portable telephone model that the player uses. Then, the player selects a corresponding displayed image of this portable telephone model on the model-selecting screen.

Figure 8:
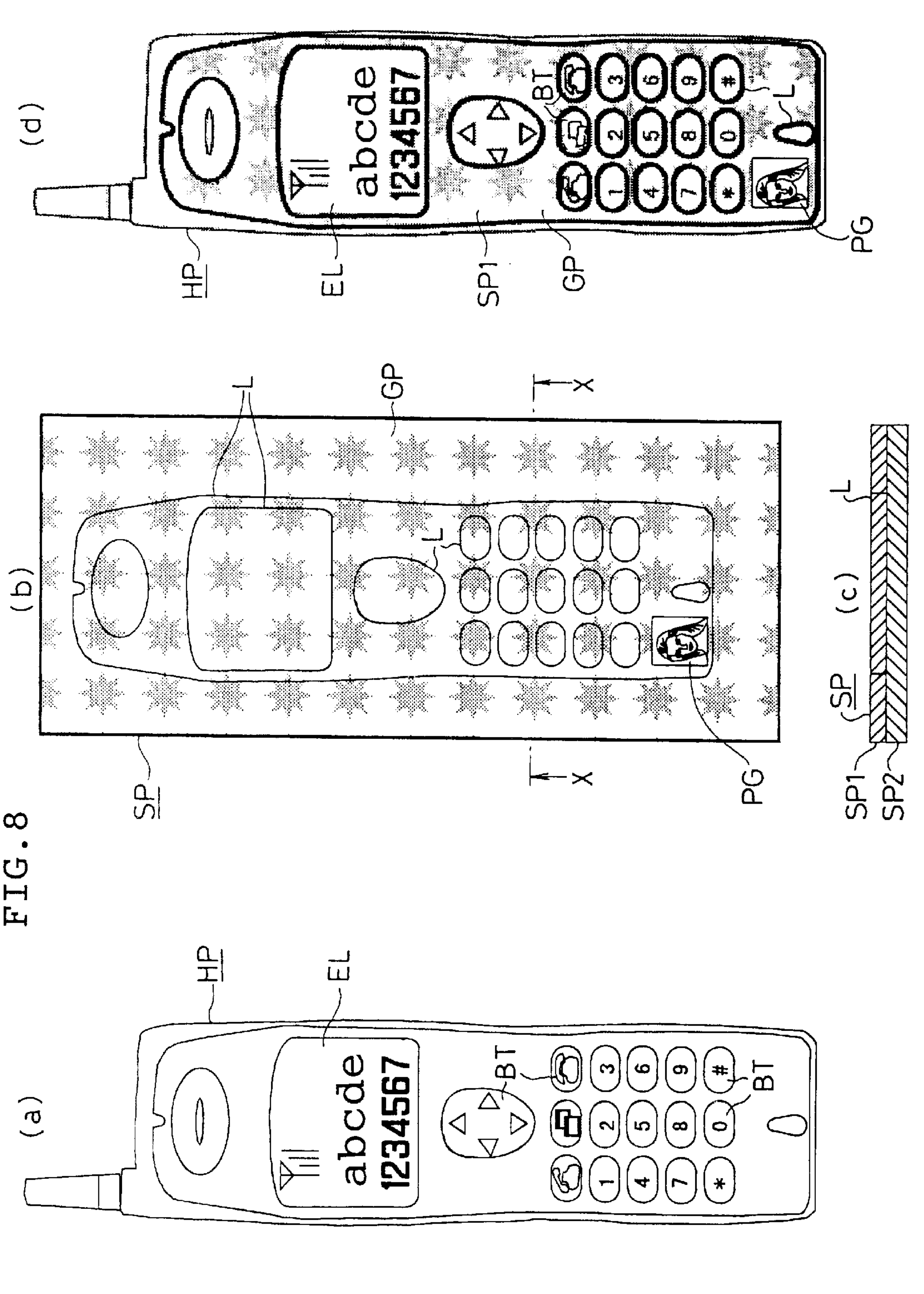
FIG. 8(*a*) is a front view of the portable telephone.

Once the portable telephone model is determined or selected, the screen of the display monitor 13 is changed to the image pattern selecting screen. The player moves the cursor C onto a desired image pattern among various displayed image patterns and then presses the enter button 16. In this embodiment, by way of example, it is assumed that the player selects the image pattern spotted by the cursor C in FIG. 5. Then, a player's image is captured by the CCD camera 23. After the player's image is captured, and the image pattern is selected, the printing/cutting device 19 and the guillotine 20 are operated, and then the printed and cut photo-sticker sheet SP is dispensed from the outlet opening 18. With reference to FIGS. 8*b* and 8*c*, the selected image pattern GP and the player's image PG, which is arranged at a predetermined position in the photo-sticker sheet SP, are printed on the dispensed photo-sticker sheet SP, and cutting lines L that correspond to a shape of the selected portable telephone model are formed on the dispensed photo-sticker sheet SP. The cutting lines L are made along edges of the portable telephone HP and also along areas, such as areas of buttons BT and liquid crystal display (LCD) EL, that should be left open for purposes of providing appropriate visibility and allowing manipulation of the portable telephone HP. The player peels off a photo-sticker SP1 from a backing sheet SP2 of the dispensed photo-sticker sheet SP along the cutting lines L and sticks the photo-sticker SP1 on a front surface of the portable telephone HP, as shown in FIG. 8(*d*). This will end the entire practical operation.

In the described embodiment, the following advantages can be obtained from the above arrangement of the photo-sticker vending machine 11.

In the described embodiment, the printing/cutting device 19, which has both printing and cutting capabilities, is used to print on and cut the;;photo-sticker sheets SP. Therefore, it is not required to preform any cutting lines on the photo-sticker sheets SP, so that a manufacturing cost of the photo-sticker sheets SP can be reduced.

In the described embodiment, since various printing image data and various cutting data are stored in the memory 22, various patterns (i.e., the printing image patterns and cutting shape patterns) of the dispensed photo-sticker sheets SP can be achieved, so that a unique interesting photo-sticker vending machine 11 can be provided.

In the described embodiment, the player can select a desired printing image data from various printing image data and also can select a desired cutting data from various cutting data (in the described embodiment, when the player selects the portable telephone model that he/she uses, the cutting data corresponding to the selected portable telephone model is automatically selected although the portable telephone model and the cutting data can be separately selected).

Therefore, in the described embodiment, the pattern of the dispensed photo-sticker sheet SP can be variously changed by changing pairing of the printing image data and the cutting data, so that more interesting photo-sticker vending machine 11 can be provided in comparison to the prior art photo-sticker vending machine.

In the described embodiment, the player's image PG is captured by the CCD camera 23 and is combined with the printing image data stored in the memory 22 to form a composite printing image. Therefore, even though the same pair of the printing image pattern and the portable telephone HP (i.e., the cutting data) is selected every time, a different player will result in a different printed image on the dispensed photo-sticker sheet SP. As a result, more interesting photo-sticker vending machine 11 can be provided in comparison to the prior art photo-sticker vending machine.

In the described embodiment, the present invention is implemented in the photo-sticker vending machine 11 that dispenses photo-stickers for the portable telephones HP. Therefore, the portable telephone HP with unique originality can be provided by sticking the photo-sticker peeled off from the photo-sticker sheet SP, which is dispensed from the photo-sticker vending machine 11 of the described embodiment, on the portable telephone HP when the player gets a little bored with a design of his/her present portable telephone HP or wants to have a unique unordinary portable telephone HP.

The described embodiment of the present invention can be modified as follows.

Although various different cutting data corresponding to shapes of the portable telephones HP are stored in the memory 22, which functions as the cutting data memory in part, any other types of cutting data, such as cutting data corresponding to simple geometrical shapes (e.g., star shapes, oblong shapes, circular shapes,;rectangular shapes or the like), can be stored in the memory 22 as the cutting data of the described embodiment.

Figure 9:
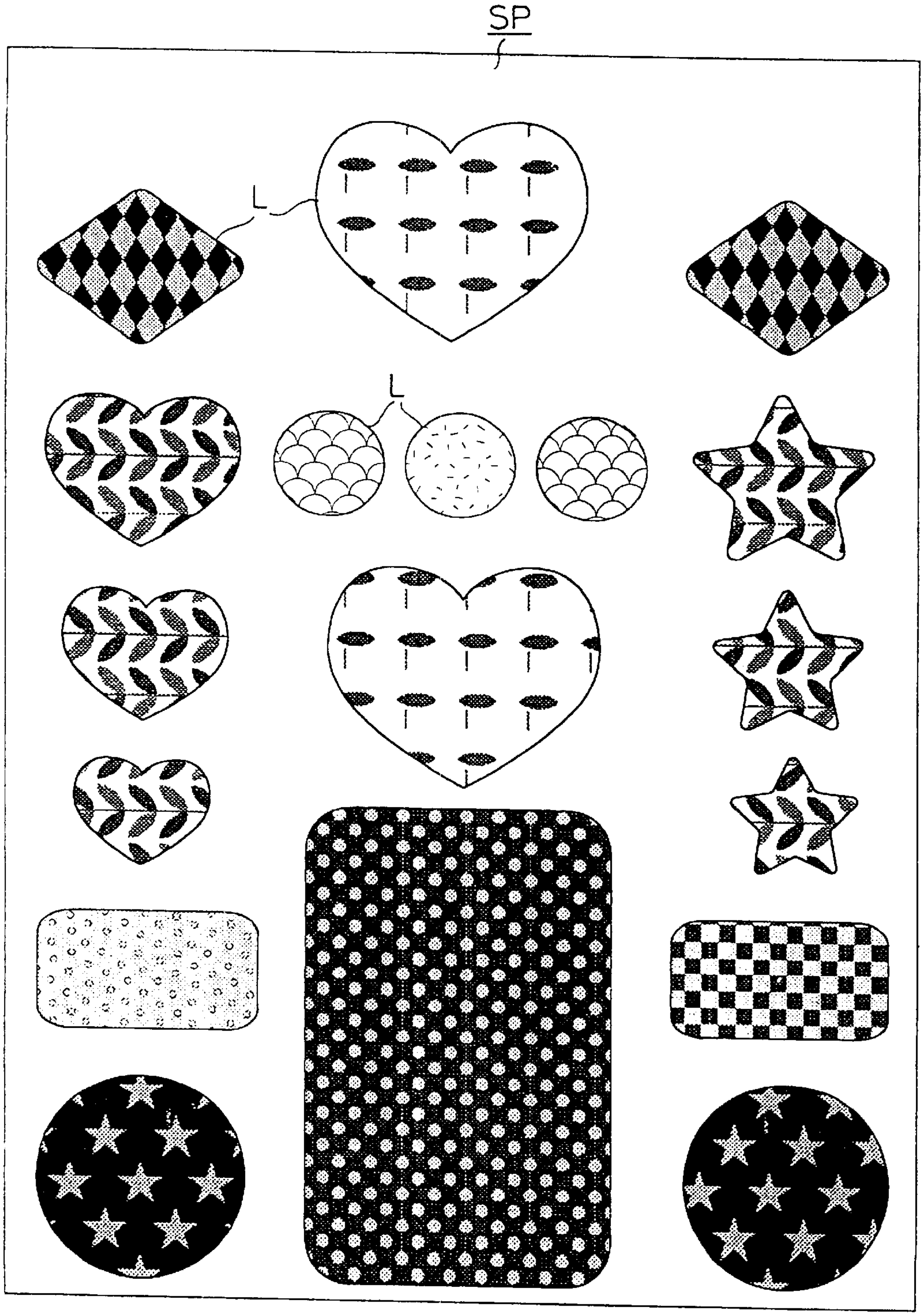
FIG. 9 is a front view of the photo-sticker sheet according to another embodiment of the present invention.

In the described embodiment, one image data, which is larger than the cutting data, is printed in the printing operation of the photo-sticker sheet SP, and the cutting lines L are formed within the printed image. Alternatively, a plurality of different images, such as images shown in FIG. 9, can be printed on the photo-sticker sheet SP, and a corresponding cutting line L can be formed along an outer peripheral line of each printed image.

Figure 6:
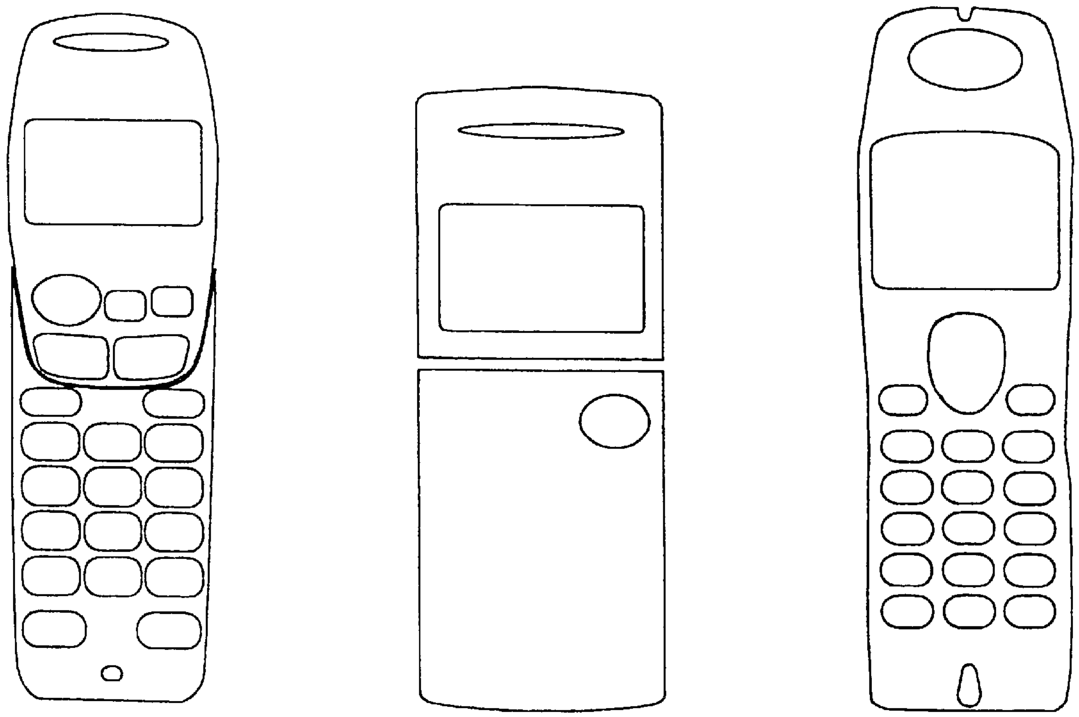
FIG. 6 is a diagram showing cutting data stored in the memory.

In the described embodiment, the entire front surface geometrical data of the portable telephone HP shown in FIG. 6 is stored as the cutting data in the memory 22, which functions as the cutting data memory in part. Alternatively, only a portion of the front surface geometrical data (e.g., only upper half of the front surface geometrical data) or the rear surface geometrical data of the portable telephone HP can be stored in the memory 22 as the cutting data. Furthermore, various different cutting data including all of the described cutting data can be stored in the memory 22.

Figure 10:
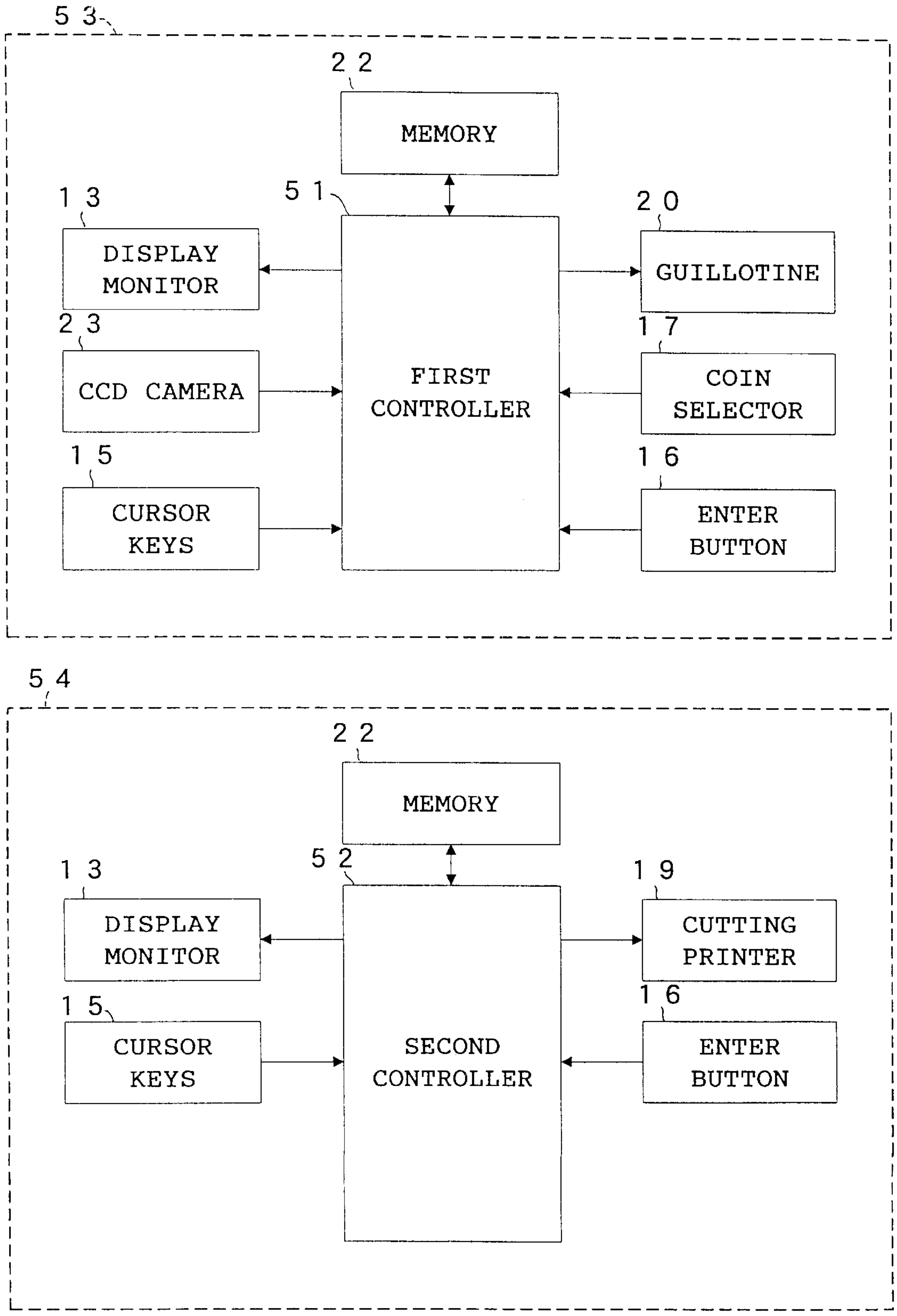
FIG. 10 is a block diagram showing electrical construction according to another embodiment.

In the described embodiment, although the printer and the cutting device are implemented by the printing/cutting device 19 that has both printing and cutting capabilities in a single integrated unit, the printer and the cutting device can be separately implemented. That is, as shown in FIG. 10, the printer 53 having only the printing capability and the cutting device 54 having only the cutting capability can be provided. In this instance, a feed mechanism for feeding the photo-sticker sheet SP between the printer 53 and the cutting device 54 should be provided.

In the described embodiment, although the rolled photo-sticker sheet SP is used, cut photo-sticker sheets, which are precut to any predetermined size, such as A5 size or B4 size, can be used.

In the described embodiment, although the player's image captured by the CCD camera 23 is arranged at a predetermined position, which is specified for each portable telephone model stored in the memory 22, on the photo-sticker, this position of the player's image on the photo-sticker can be changed to any position within the photo-sticker. Furthermore, a selecting means for selecting a desired position of the player's image within the photo-sticker from various possible positions can be provided.

In the described embodiment, although various patterns of the printing image data and the cutting data are stored in the memory 22, only one type of printing image data and one type of cutting data can be stored in the memory 22 for each portable telephone model.

In the described embodiment, the player's image PG is captured by the CCD camera 23 acting as the external input means and is combined with the printing image data to form a composite printing image, which is then printed on the photo-sticker sheet SP. A keyboard acting as another external input means and having alphabetical character keys, Japanese character keys or any other language character keys, can be provided on the machine body 12 of the photo-sticker vending machine 11 to allow the player to operate the keyboard and input characters (e.g., a name of the player). These input characters are then combined with the printing image data and are printed on the photo-sticker sheet SP. With this arrangement, another unique original photo-sticker sheet SP can be produced.

In the described embodiment, although the player can choose any printing image data and cutting data by operating the cursor keys 15 and the enter button 16, the controller 21 can be modified to choose respective data automatically without instructions from the player. Furthermore, one to one relationship can be established between the printing image data and the cutting data, and the player is allowed to choose only the printing image data. Therefore, when one desired printing image data is selected by the player, the corresponding cutting data is automatically determined by the controller.

In the described embodiment, although the coin selector 17, into which coins are inserted, is used as a charging means, any type of charging means, such as a charging means that can accept any kinds of bills, prepaid cards or the like, can be used. Alternatively, the photo-sticker vending machine 11 can be implemented without the charging means.

Therefore, the present examples and embodiments are to be considered as illustrative and not restrictive and the invention is not to be limited to the details given herein, but may be modified within the scope and equivalence of the appended claims.

What is claimed is:

1. A vending machine for creating user-selected and user-defined adhesive decals for portable consumer electronic devices, the vending machine comprising:

a memory for storing a plurality of decal templates, the decal templates comprising at least decal shape for a plurality of portable consumer electronic devices, decal background colors and decal design patterns;

an image capturing device for capturing an image;

a printer for printing the decal on adhesive paper;

a cutting device for cutting the adhesive paper;

a user input means;

a display means; and a controller coupled to the memory, the image capturing device, the printer, the cutting device, the user input means and the display means, wherein the controller receives payment from a user through one of a coin slot and the user input means, the controller displays a plurality of decal templates for a plurality of portable consumer electronic devices for selection by the user, the user selects at least a template for a portable consumer electronic device, the template's background color and pattern using the user input means, the selected decal template is combined with an image captured by the image capturing device if the user elects to combine the template and a captured image, the combined image of the decal template and captured image is displayed for the user and the printer and cutter, under command of the controller, print and cut out the user-selected and user-defined adhesive decal for attachment to the user's portable consumer electronic device if the combined decal template and captured image is acceptable to the user.

2. The vending machine of claim 1 wherein the vending machine can be coupled to a remote computer system through a communications port, the remote computer system storing additional decal templates, the communications port being coupled by a bus to the controller and memory and wherein new decal templates for additional portable consumer electronics devices can be loaded into the memory through the controller and bus from the communications port when the port is coupled to the remote computer system.

* * * * *